(12) United States Patent
Dhiman et al.

(10) Patent No.: US 11,810,487 B2
(45) Date of Patent: Nov. 7, 2023

(54) DISPLAY SYSTEM FOR DIRECTING DIFFERENT IMAGES TO DIFFERENT VIEWERS

(71) Applicant: Rovi Guides, Inc., San Jose, CA (US)

(72) Inventors: Rohit Dhiman, Uttarakhand (IN); Srishti Sharma, Bihar (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/107,081

(22) Filed: Nov. 30, 2020

(65) Prior Publication Data
US 2022/0172651 A1 Jun. 2, 2022

(51) Int. Cl.
*G09G 3/00* (2006.01)
*G06F 3/01* (2006.01)
*G09G 5/14* (2006.01)
*G02B 26/08* (2006.01)
*G02B 27/00* (2006.01)

(52) U.S. Cl.
CPC ......... *G09G 3/001* (2013.01); *G02B 26/0833* (2013.01); *G02B 27/0093* (2013.01); *G06F 3/011* (2013.01); *G09G 5/14* (2013.01); *G09G 2310/0275* (2013.01); *G09G 2320/068* (2013.01); *G09G 2354/00* (2013.01); *G09G 2370/08* (2013.01)

(58) Field of Classification Search
CPC ..... G02B 5/045; G06F 1/1601; G06F 1/1609; H01J 2329/897; H01J 29/89
See application file for complete search history.

(56) References Cited

U.S. PATENT DOCUMENTS

| | | | | |
|---|---|---|---|---|
| 5,808,596 A | * | 9/1998 | Kim | ..... G09G 3/3611 345/98 |
| 2008/0285282 A1 | * | 11/2008 | Karman | ..... H01L 51/5275 362/249.16 |
| 2009/0058845 A1 | * | 3/2009 | Fukuda | ..... B60K 35/00 345/214 |
| 2011/0159929 A1 | * | 6/2011 | Karaoguz | ..... H04N 13/341 455/566 |
| 2012/0274556 A1 | * | 11/2012 | Suglyama | ..... G09G 3/003 345/156 |
| 2016/0165218 A1 | * | 6/2016 | Seo | ..... G02B 27/017 345/8 |

* cited by examiner

*Primary Examiner* — Ram A Mistry
(74) *Attorney, Agent, or Firm* — HALEY GUILIANO LLP (57) ABSTRACT

Display systems for simultaneously directing different images to different viewers. A display system is constructed with a display panel with multiple folds that create a number of angled display surfaces. These angled surfaces are oriented so that some surfaces are angled in one direction to project one image to viewers at one location, and the remaining surfaces are angled in a different direction to project a different image to viewers at another location. The folded display panel may be actuated, to change the angles at which display surfaces are oriented, and thus adjust the directions in which images are displayed. In this manner, the display may project images to differing users as they change their locations. Multiple users may thus enjoy differing content at the same time, from the same display device.

20 Claims, 6 Drawing Sheets

DISPLAY SYSTEM FOR DIRECTING DIFFERENT IMAGES TO DIFFERENT VIEWERS

BACKGROUND

The present disclosure relates generally to display systems. More specifically, the present disclosure relates to display systems for directing different images to different viewers.

SUMMARY

Contemporary flat panel displays are much slimmer, more space-efficient, and often more power-efficient than past displays. However, contemporary displays maintain some of the same limitations of past displays. In particular, a single display often may only project one image or set of images at a time. If two different users desire to simultaneously view two different sets of content, they will still require two different displays to do so. For example, two different family members that desire to watch conflicting programming, or stream two different shows at the same time, will each require their own displays to do so. A single display cannot typically accommodate the wishes of both of these family members at the same time.

To overcome the limited ability of display systems to simultaneously display more than one image to differing viewers, systems and methods are described herein for a display system that projects different images in different directions, so that users in one location may view and listen to one type of content, and users in a different location may view and listen to different content at the same time. This allows for the display of multiple different images as desired, from fewer screens, in turn offering a more economical and space-efficient solution to the problem of displaying a variety of content to capture the attention of many different users.

In some embodiments of the disclosure, a display is constructed with a display panel that has folds extending along one direction, to create a number of, e.g., vertical strip-like regions between folds. The display panel is folded along each of the folds, to create a panel that has a triangular- or sawtooth-shaped cross-section, where opposing sides display differing images in different directions. That is, each triangular or sawtooth shape has sides that display different images, so that collectively, the sides that face one direction project one image, and the sides that face another direction project another different image. In this manner, a single display has two different portions that project images in two different directions, allowing a single display to simultaneously project two different images to different users in different locations.

In some embodiments of the disclosure, successive folds of a display panel are bent in opposing directions, to create a panel in which alternating surfaces each face the same direction. That is, every other surface faces the same direction. In other words, a first set of surfaces faces one direction, and an alternating second set of surfaces faces another direction. A display controller then directs one image to the first set of surfaces, and another image to the second set of surfaces, so that the first set of surfaces projects one image in one direction, and the second set of surfaces simultaneously projects the other image in another direction. This allows two different users to view two different images from the same display. The display system may include two speakers or other audio systems, so that each image is accompanied by its own unique audio signal. In this manner, two different users may each receive a different audio/visual experience from the same display system.

The display panels of embodiments of the disclosure may be thought of as a pixel array that is segmented by folding. The display panel is thus divided into pixel array segments, with each segment containing a number of pixel columns. Panel segments may be of any size. Accordingly, each segment may contain any suitable number of the display's pixel columns.

Display systems of embodiments of the disclosure may also include actuators that compress or expand the folded display panel, to move the folds closer together or farther apart, thus altering the viewing angle of each displayed image. For example, one or more actuation elements may be coupled to the display panel to actuate the panel between more compressed configurations that display differing images farther apart from each other, and less compressed configurations that display differing images closer together. The actuation elements may be coupled between adjacent folds to actuate each fold individually, or may be coupled across multiple folds. Actuators may also be of any type, such as micro-electromechanical system (MEMS) actuators or larger actuators, and may perform actuation according to any method. For example, an actuation element may be or include a thermal actuator, a piezoelectric actuator, an electrostatic actuator, or a magnetic actuator.

In some embodiments of the disclosure, display systems may also automatically detect the positions of viewers or users, and adjust the folded configuration of display panels accordingly, to direct images to detected users. In particular, display systems may include one or more sensors in communication with a display controller programmed to detect users and determine their positions relative to the display. The display controller may then adjust the folds of the display panel to direct its images to the detected users. In this manner, displays of embodiments of the disclosure may automatically adjust to direct images to users as they move, or as new viewers are detected.

Displays of embodiments of the disclosure may also account for expansion and contraction of the display panel and the associated change in viewing area. In particular, the viewing area of a display panel changes as it is compressed or expanded. Accordingly, embodiments of the disclosure contemplate flexible or adjustable displays that alter their display area according to the configuration of its display panel, growing or shrinking the display area as the display panel folds are expanded or compressed. Similarly, embodiments of the disclosure contemplate displays with a housing enclosing or partially enclosing the display panel to form a fixed viewing area with space accommodating the display panel as it grows or shrinks. For example, the enclosure may be positioned over opposing sides of the display panel, allowing the panel's sides to extend underneath sides of the enclosure as it is expanded. In this manner, the enclosure acts as a bezel generating a non-viewing area that can cover a portion of the display panel as it is unfolded. Folding the display panel thus retracts these portions, drawing them back into the viewing area. In this manner, a viewing area of constant size may be generated, regardless of whether the display panel is folded or unfolded.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to display systems for simultaneously directing different images to different viewers. A display system is constructed with a display panel with multiple folds that create a number of angled display surfaces. These angled surfaces are oriented so that some surfaces are angled in one direction to project one image to viewers at one location, and the remaining surfaces are angled in a different direction to project a different image to viewers at another location. The folded display panel may be actuated, to change the angles at which display surfaces are oriented, and thus adjust the directions in which images are displayed. In this manner, the display may project images to differing users as they change their locations. Multiple users may thus enjoy differing content at the same time, from the same display device.

Figure 1:
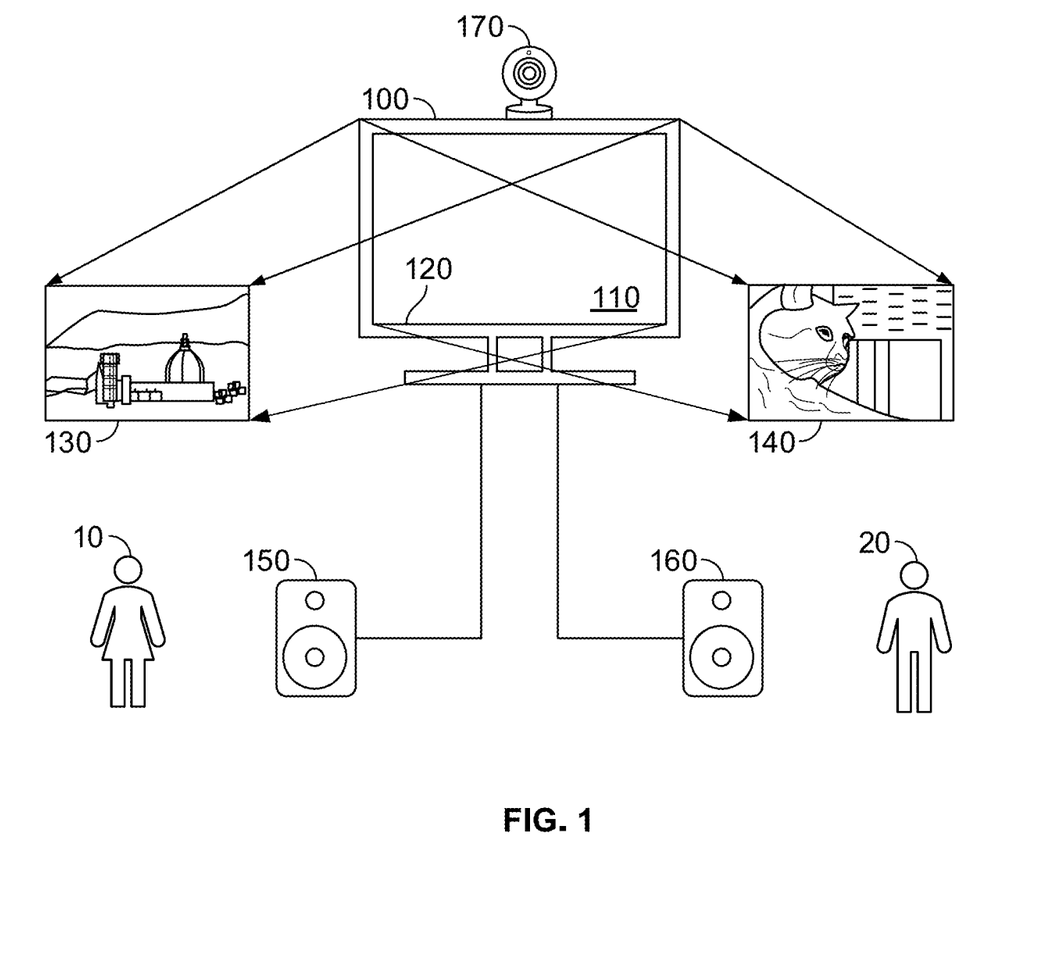
FIG. 1 conceptually illustrates operation of an exemplary display system for directing different images to different viewers, in accordance with embodiments of the disclosure.

FIG. 1 conceptually illustrates operation of an exemplary display system for directing different images to different viewers, in accordance with embodiments of the disclosure. Here, a display 100 simultaneously projects two different images 130, 140 in two different directions from the same display area 110, as shown. In particular, image 130 is projected leftward to viewer 10 in the view of FIG. 1, and image 140 is projected rightward toward viewer 20. As an example, user 10 may request content to be displayed on display 100, such as via an interface presented by display 100. User 20 may also request content from display 100, such as via the same interface or another separate interface projected in the direction of user 20. When the two users 10, 20 request different content 130, 140, display 100 may display this content 130, 140 in two different directions, to the two different users 10, 20, from the same display area 110. Thus, display 100 projects two different images 130, 140 from the same display area 110, in two different directions, to be viewed by two different users 10, 20. Speakers 150, 160 may direct two different audio signals, e.g., signals accompanying images 130, 140 respectively, to users 10 and 20. In this manner, display 100 may direct separate audio and video signals to each of users 10 and 20, from a single display area 110.

A sensor 170 in electronic communication with display 100 may be used to determine the locations of users/viewers 10, 20 in known manner, such as via known computer vision or machine learning techniques. The display may then direct images 130, 140 to the locations or positions of each user 10, 20, by adjusting the orientation of its folded display surfaces. That is, display 100 may determine the locations of nearby viewers 10, 20, and direct separate images 130, 140 to the locations of these detected viewers 10, 20.

Figure 2:
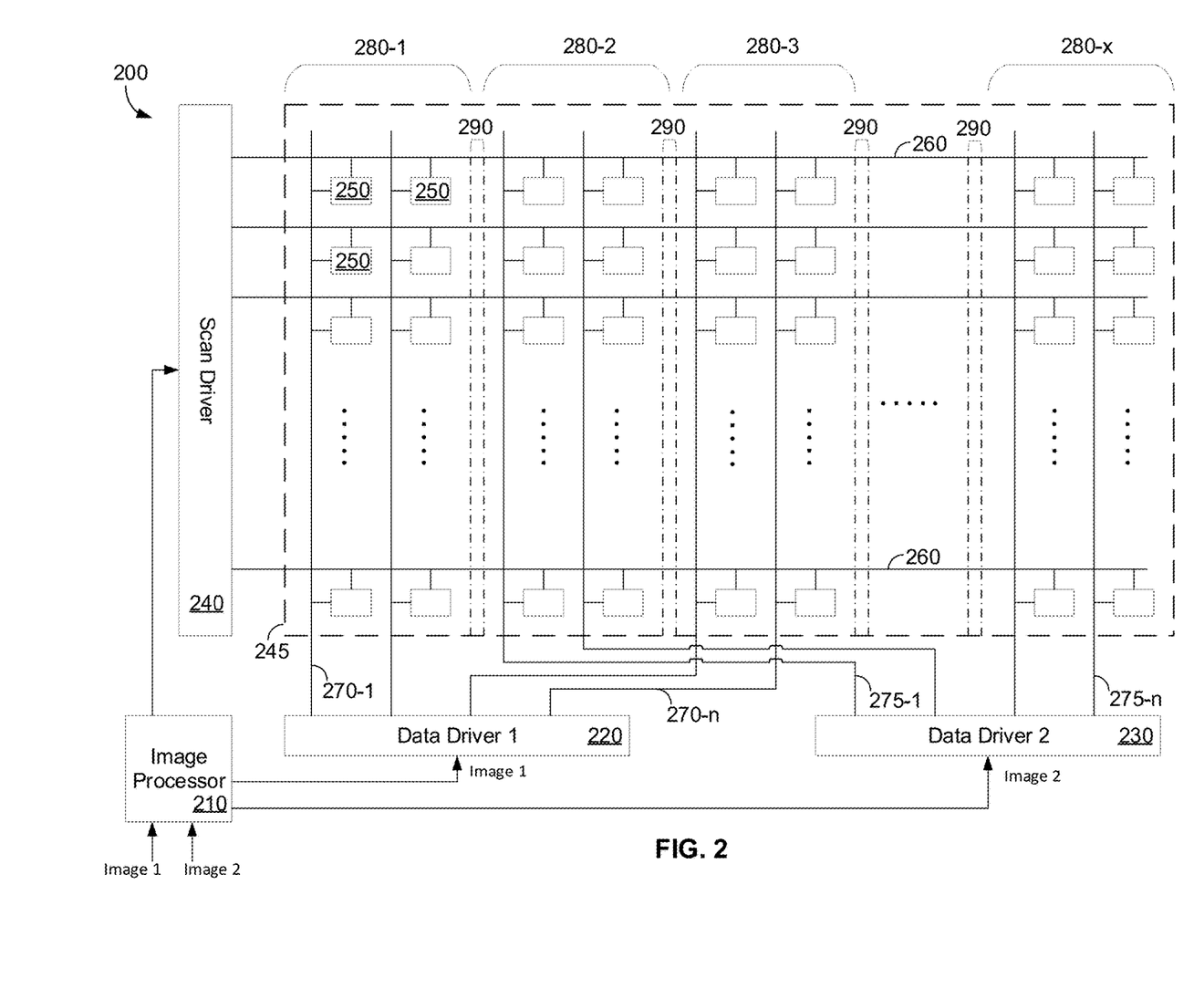
FIG. 2 is a structural diagram illustrating layout of a display panel constructed in accordance with embodiments of the disclosure.

FIG. 2 is a structural diagram illustrating layout of a display panel constructed in accordance with embodiments of the disclosure. Referring to FIG. 2, the display panel 200 according to an embodiment of the present disclosure includes an image processor 210, a scan driver 240, a first data driver 220, a second data driver 230, and a display substrate 245. When the display panel 200 is a light emitting display panel, each light emitting unit 250 may be a pixel region of the display substrate 245.

The image processor 210 receives various control signals, as well as image data for two different images Image 1 and Image 2. Image 1 and Image 2 may be image signals of any moving or still images, such as for example two different video streams. The image processor 210 may receive these control signals and image signals from, e.g., an external source such as a streaming source, a video broadcast system, an internet protocol signal, or the like. The image processor 210 realigns the received image data, transmits the realigned image data of Image 1 to data driver 220, and transmits the realigned image data of Image 2 to data driver 230. In particular, the image processor 210 generates scan control signals and data control signals, which are used to drive the respective scan driver 240 and data drivers 220, 230.

The scan driver 240 receives a scan control signal supplied from the image processor 210 and generates a scan signal corresponding to the scan control signal. The scan signal generated by the scan driver 240 is supplied to unit regions (e.g., pixels or pixel regions) 250 through scan lines 260.

The first data driver 220 receives a data control signal and image data Image 1, which are supplied from the image processor 210, and generates corresponding data signals. The data signals generated by the first data driver 220 are output to data lines 270-1-270-n. The data signals output to the data lines 270-1-270-n are input to corresponding pixels 250 on a horizontal pixel row which is selected by the scan signal.

The second data driver 230 receives a data control signal and image data Image 2, which are supplied from the image processor 210, and generates corresponding data signals. The data signals generated by the second data driver 230 are output to data lines 275-1-275-n. The data signals output to the data lines 275-1-275-n are input to corresponding pixels 250 on a horizontal pixel row which is selected by the scan signal.

The display substrate 245 may include a plurality of pixels 250 formed thereon and connected to the scan lines 260 and the data lines 270-1-270-n, 275-1-275-n. In some embodiments, each of the pixels 250 may include one or more LED elements formed in known manner. The pixels 250 selectively emit light corresponding to a data signal input from the data lines 270-1-270-n, 275-1-275-n when a scan signal is supplied to the scan lines 260. As an example, each of the pixels 250 may emit light having a luminance corresponding to the input data signal during each frame period. A pixel 250 supplied with a data signal corresponding to a black luminance does not emit light during the corresponding frame period, thereby providing black. When the light emitting unit 250 is a pixel unit of an active light emitting display panel, the light emitting unit 250 may be driven according to pixel power sources in known manner, in addition to the scan and data signals.

The display substrate 245 is folded at intervals as shown. More specifically, folds 290 are formed in the display substrate 245, to form display areas 280-1-280-x therebetween. Display substrate 245 is then folded along each of the folds 290, to orient each display area 280-1-280-x in a predetermined direction. As can be observed, Image 1 and Image 2 data are transmitted to different display areas 280-1-280-n. In particular, data lines 270-1-270-n of first data driver 220 are connected to pixels 250 of odd display areas 280-1, 280-3, . . . , 280-(x−1), so that odd display areas 280-1, 280-3, . . . , 280-(x−1) collectively display the image of image data Image 1. Similarly, data lines 275-1-275-n of second data driver 230 are connected to pixels 250 of even display areas 280-2, 280-4, . . . , 280-x, so that even display areas 280-2, 280-4, . . . , 280-x collectively display the image of image data Image 2. Accordingly, odd display areas 280-1, 280-3, . . . , 280-(x−1) collectively project Image 1 in one predetermined direction, and even display areas 280-2, 280-4, . . . , 280-x collectively project Image 2 in another predetermined direction.

While FIG. 2 illustrates a display substrate 245 constructed as an LED display, it is noted that embodiments of the disclosure may employ any type of display, constructed with any type of light emitters. For example, display substrate 245 may be a display panel of a liquid crystal display (LCD), amorphous silicon display, low temperature poly silicon display, electronic ink display, electrophoretic display, active matrix display, electro-wetting display, electro-fluidic display, electroluminescent display, plasma display panel, high-performance addressing display, thin-film transistor display, organic light-emitting diode display, surface-conduction electron-emitter display (SED), laser television, carbon nanotube display, quantum dot display, interferometric modulator display, or any other suitable system for displaying visual images. In some embodiments, display substrate 245 may be a high density television (HDTV) display panel. In some embodiments, display substrate 245 may be a 3D display panel. Any type display is contemplated.

Figure 3:
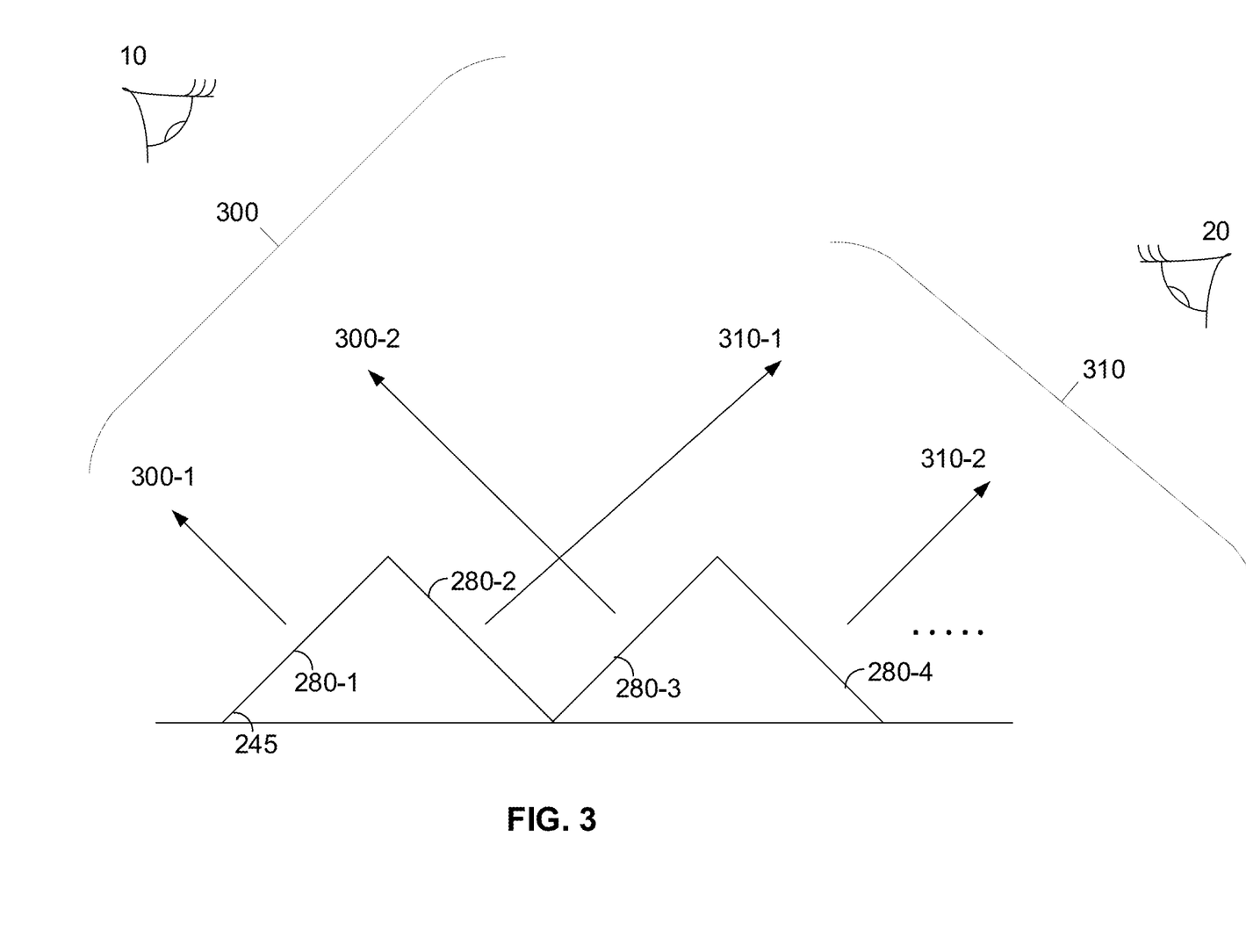
FIG. 3 is a cross-sectional illustration of a folded display panel illustrating projection of different images to different viewers, in accordance with embodiments of the disclosure.

FIG. 3 is a cross-sectional illustration of a folded display panel illustrating projection of different images to different viewers, in accordance with embodiments of the disclosure. As can be seen from FIG. 2, each data driver 220, 230 drives every other display area 280, with the display areas 280 driven by first data driver 220 being interleaved with the display areas 280 driven by second data driver 230. Thus, each data driver 220, 230 drives every other display area 280, i.e., the image generated by each data driver 220, 230 is projected from every other display area 280. As one example, first data driver 220 drives odd display areas 280-1, 280-3, . . . , 280-(x−1) so that each projects a portion of the image of Image 1, and the odd display areas 280-1, 280-3, . . . , 280-(x−1) are each oriented in a single direction to collectively project the image of Image 1 in one predetermined direction. Similarly, second data driver 230 drives even display areas 280-2, 280-4, . . . , 280-x so that each projects a portion of the image of Image 1, and the even display areas 280-2, 280-4, . . . , 280-x are each oriented in a single direction to collectively project the image of Image 2 in another predetermined direction.

FIG. 3 illustrates this process in further detail. First data driver 220 is connected to the pixel columns of odd numbered display areas, in this case display areas 280-1 and 280-3, and thus drives these display areas 280-1 and 280-3 to project image portions 300-1 and 300-2 respectively. As each image portion 300-1, 300-2, etc. is projected in the same direction, viewer 10 perceives the entirety of the image of Image 1. That is, every other display area 280-1, 280-3, etc. faces the same direction (toward viewer 10 in the view of FIG. 3), and each is driven to display a portion 300-1, 300-2, etc. of image 300, the display areas 280-1, 280-3, etc. collectively project the image of Image 1 to viewer 10, so that viewer 10 perceives a single image (the image of Image 1) from display panel 245. Similarly, as every other display area 280-2, 280-4, etc. faces the same direction (toward viewer 20 in the view of FIG. 3), and each is driven to display a portion 310-1, 310-2, etc. of image 310, the display areas 280-2, 280-4, etc. collectively project the image of Image 2 to viewer 20, so that viewer 20 perceives a single image (the image of Image 2) from display panel 245.

Figure 4A:
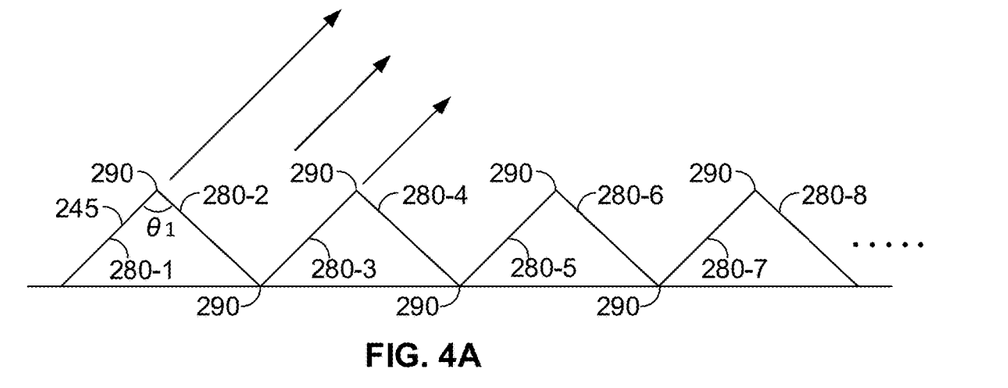
FIG. 4A is a cross-sectional illustration of a folded display panel constructed in accordance with embodiments of the disclosure.

FIG. 4A is a cross-sectional illustration of a folded display panel constructed in accordance with embodiments of the disclosure. As can be seen, display substrate 245 is bent or folded in opposing directions at each successive fold 290, so that adjacent sections 280-x form a triangular or sawtooth shape in cross-section, with one adjacent section 280-(x−1) facing in one direction and the other adjacent section 280-x facing in another direction. Each section 280-x projects a portion of an image, so that odd display areas 280-1, 280-3, . . . , 280-(x−1) collectively project Image 1 in one predetermined direction, and even display areas 280-2, 280-4, . . . , 280-x collectively project Image 2 in another predetermined direction.

Figure 4B:
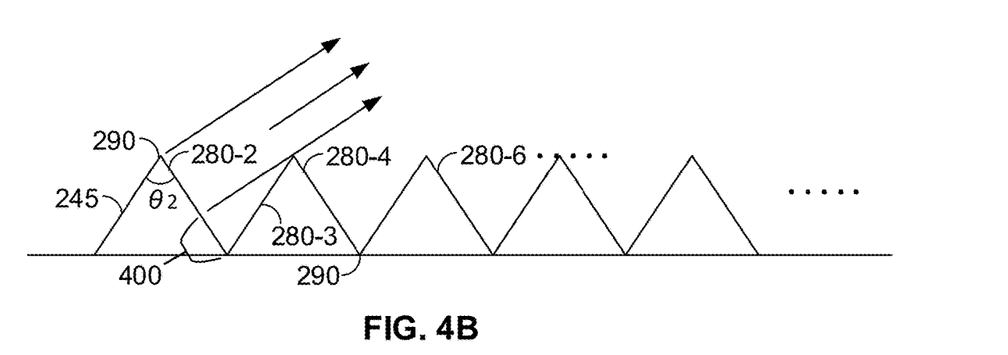
FIG. 4B is a cross-sectional illustration of a compressed display panel constructed in accordance with embodiments of the disclosure.

As above, each segment 280-x projects a portion of the image toward a viewer. Accordingly, it may be preferable for display panel 245 to orient each of its segments 280-x such that their respective image portions are not blocked by any other segment 280-x. For example, in the view of FIG. 4A, segment 280-2 should be oriented such that emitted light rays are not blocked by adjacent segment 280-3. It can therefore be observed that adjacent segments 280-1 and 280-2 should be folded such that their included angle $\theta_1$ is greater than or equal to approximately 90°. That is, in some embodiments of the disclosure, it may be preferable for the included angle between adjacent segments 280-(x−1), 280-x to be approximately 90° or greater ($\theta_1 \geq 90°$). In some embodiments, it may also be preferable for viewers to view displayed images along the direction in which they are displayed. As one example, when $\theta_1 = 90°$, it can be seen that image portions displayed by each segment 280-2, 280-4, . . . align with each other, with no appreciable gap or space in-between. Viewers accordingly may perceive this image best when they are positioned along the direction in which the image is displayed, i.e., when they are positioned along the direction of the arrows of FIG. 4A (the $\theta_1 = 90°$ direction). More broadly, in some embodiments, it may be preferable for viewers to be positioned along the direction in which the image is displayed, i.e., along the direction If the included angle between adjacent segments 280-(x−1), 280-x is less than approximately 90°, i.e., if $\theta_1 \leq 90°$, portions of the displayed image may be blocked. This case is illustrated in FIG. 4B, which is a cross-sectional illustration of a compressed display panel constructed in accordance with embodiments of the disclosure. As can be seen, if segments 280-x are compressed such that the included angle $\theta_2$ between adjacent segments 280-(x−1), 280-x is less than 90°, a portion of each segment 280-x is blocked by its adjacent segment. As an example, it can be seen that if $\theta_2 \leq 90°$, portion 400 of segment 280-2 is blocked from view by adjacent segment 280-3. That is, if $\theta_2 \leq 90°$, part of each segment 280 is blocked from view by its adjacent segment 280, i.e., segments partially interfere with each other. In such a configuration, portions of each displayed image, i.e., portion 400 of each segment 280-x, would be blocked from view and imperceptible to viewers. Accordingly, in configurations in which $\theta_2 \leq 90°$, viewers would undesirably perceive an incomplete image. Some embodiments of the disclosure may at least partially compensate for this effect by, for example, removing pixel columns from portion 400 of each segment 280-x, or only utilizing those pixel columns not located within portion 400 to construct images. In some embodiments of the disclosure, additional folds pulled into the viewing area of the display 100 from under, e.g., enclosure 510 described further below, may be employed to complete the image as desired. That is, pixel columns from segments 280-x pulled into the viewing area of the display may be used to compensate for the unusable pixel columns of portions 400.

Figure 4C:
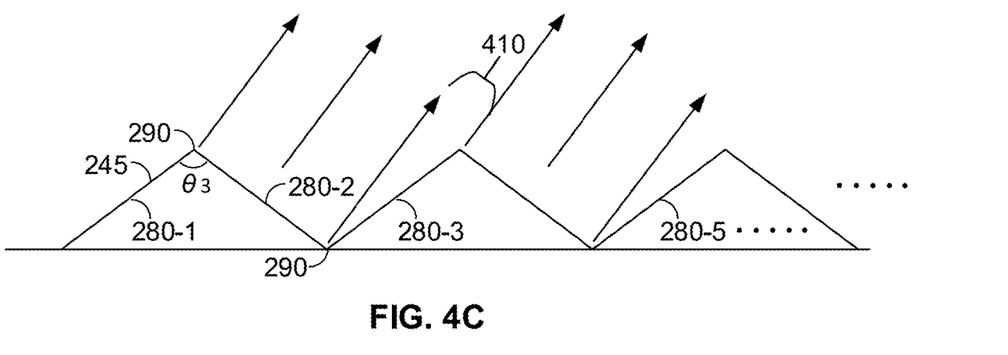
FIG. 4C is a cross-sectional illustration of an elongated display panel constructed in accordance with embodiments of the disclosure.

This is not the case if the included angle between adjacent segments 280-(x−1), 280-x is greater than 90°. This case is illustrated by FIG. 4C, which is a cross-sectional illustration of an elongated display panel constructed in accordance with embodiments of the disclosure. Here, for example, the included angle between adjacent segments 280 is $\theta_3 > 90°$, and the image portion emitted by segment 280-2 is accordingly not blocked by adjacent segment 280-3. Thus, when $\theta_3 > 90°$, the display panel 245 does not interfere with itself, and images emitted by display panel 245 may be fully perceived by viewers. However, it may be seen that gaps 410 may exist between adjacent image portions when $\theta_3 > 90°$. Accordingly, when $\theta_3 > 90°$, viewers may perceive undesirable gaps 410 within the displayed image. In some embodiments, then, it may be desirable for $\theta$ to remain within an acceptable range centered around 90°. That is, it may be desirable for $90° - \alpha \leq \theta \leq 90° + \alpha$, where $\alpha$ may be any suitable value, e.g., 5°, 10°, 15°, or the like. Additionally, as image quality may degrade with deviation from viewing along the direction at which the image is displayed, it may be desirable for viewers to be positioned along the direction at which the image is displayed, e.g., along the image display direction corresponding to $\theta$.

Accordingly, in some embodiments of the disclosure, it may be preferable for display panels 245 to be folded such that adjacent folded segments have included angles that fall within a desired range. Any such range is contemplated. As shown in FIGS. 4A-4C, it may be desirable for the included angle to be greater than or equal to approximately 90°, i.e., $\theta \geq 90°$. In some embodiments, it may be preferable for the included angle to be within some range that includes 90°, such as $90° - \alpha \leq \theta \leq 90° + \alpha$, where $\alpha$ may be any suitable value, e.g., 5°, 10°, 15°, or the like. In some embodiments, it may be preferable for this range to be asymmetric with respect to 90°, e.g., $90° - \alpha \leq \theta \leq 90° + \beta$, where $\alpha \neq \beta$. As a nonlimiting example, $\alpha$ may be any value 5°, while $\beta$ may be any value $\leq 10°$. Any values of $\alpha$ and $\beta$ are contemplated. In some embodiments, it may further be preferable for values of $\theta$ to be based on viewer location. As further described herein, it may be preferable for segments 280 to direct their images directly at viewers, to present the best image. Accordingly, embodiments of the disclosure contemplate detection of viewers, determination of their location, and setting of $\theta$ to values resulting in direction of images to the determined viewer location.

In some embodiments, it may also be preferable for this included angle $\theta$ to be less than some maximum value, to avoid simultaneous viewing of the other image displayed by display panel 245. That is, if $\theta$ is too large and the display panel 245 is thus excessively flat, viewers may be able to perceive both displayed images Image 1 and Image 2 at the same time. Accordingly, in some embodiments of the disclosure, it may be desirable for $\theta$ to be less than some upper bound value. Embodiments of the disclosure contemplate any value greater than 90° for this upper bound, e.g., 100°, 110°, 120°, or the like. Embodiments of the disclosure also contemplate use of included angles $\theta_2 \leq 90°$ such as in FIG. 4B for any reason. This situation may be acceptable when, for example, portion 400 does not contain any pixels 250 and their blockage thus does not result in blockage of any portion of the displayed image. Any value of $\theta_2 \leq 90°$ is contemplated, e.g., 50°, 60°, 70°, 80°, or the like.

Figure 5:
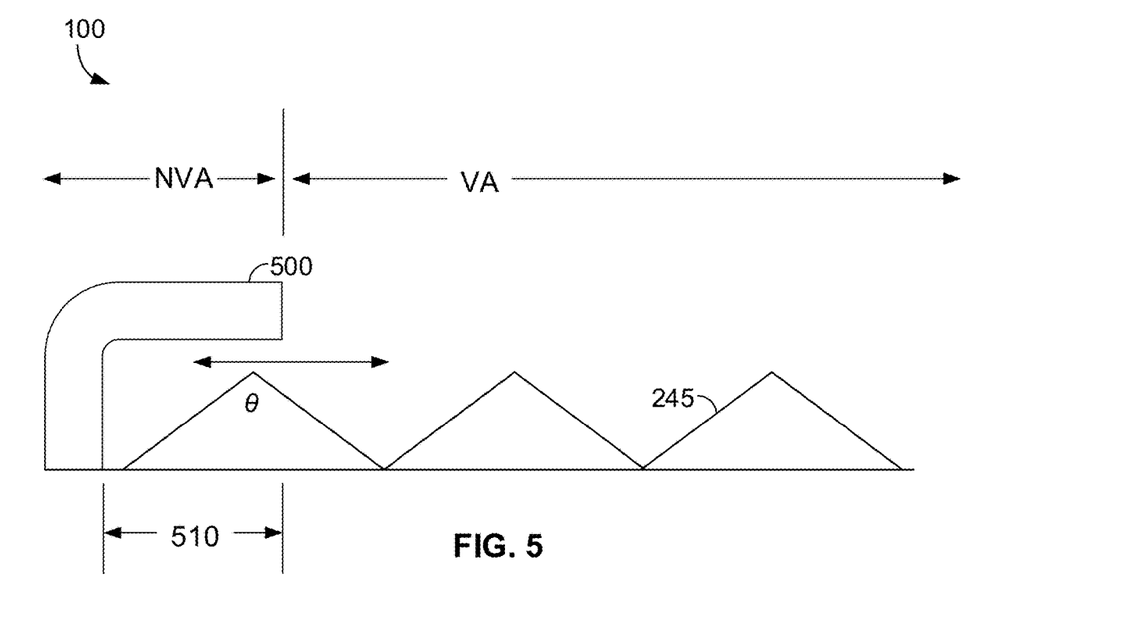
FIG. 5 is a cross-sectional illustration of a partially enclosed folded display panel, in accordance with embodiments of the disclosure.

As display substrate 245 is adjusted to increase or decrease $\theta$, substrate 245 correspondingly folds or unfolds, increasing or decreasing its footprint. That is, substrate 245 may expand or contract laterally as it is adjusted to increase or decrease $\theta$. In some embodiments of the disclosure, display 100 may be constructed with a housing that accommodates this expansion and contraction. FIG. 5 is a cross-sectional illustration of a partially enclosed folded display panel, in accordance with some embodiments of the disclosure. Here, display 100 is constructed with a housing 500 extending over a portion of display substrate 245 when substrate 245 is extended (i.e., when $\theta$ is large). Housing 500 may be an opaque structure that overlies the display substrate 245 to form a region 510 that accommodates substrate 245 when it is expanded or stretched to large values of $\theta$. In this manner, housing 500 may prevent viewing of that portion of substrate 245 which lies within region 510, forming a viewing area (VA) in which the substrate 245 is visible to viewers, and a non-viewing area (NVA) in which the substrate 245 is hidden from viewers of display 100.

As $\theta$ is altered, display substrate 245 expands or contracts laterally, in the direction of the horizontal arrows shown, and region 510 forms a viewing area VA of fixed size regardless of the degree of expansion or contraction of substrate 245. In this manner, housing 510 may be employed to form a region 510 for accommodating expansion of substrate 245 and presenting a fixed viewing area VA to viewers.

Figure 6:
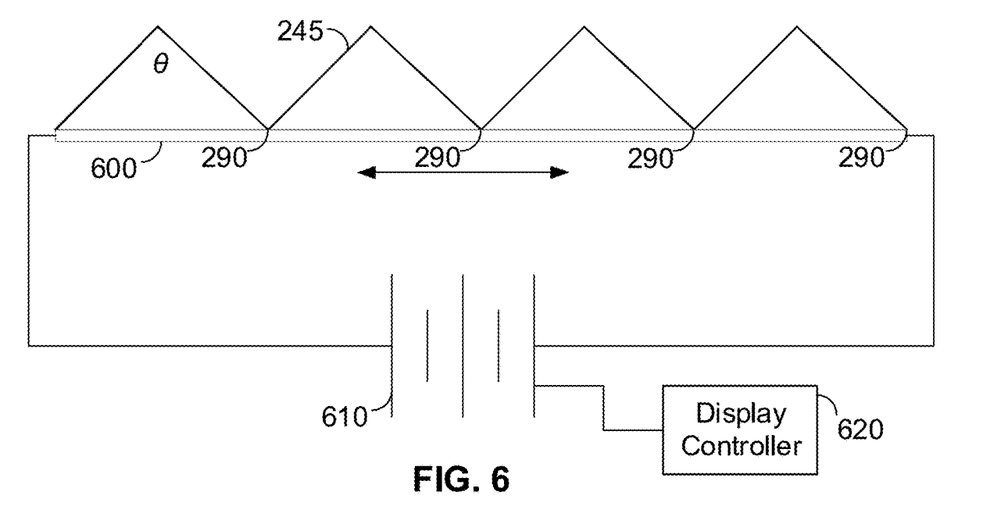
FIGS. 6-8 are cross-sectional illustrations of display panels and exemplary actuators, constructed in accordance with embodiments of the disclosure.
Figure 7:
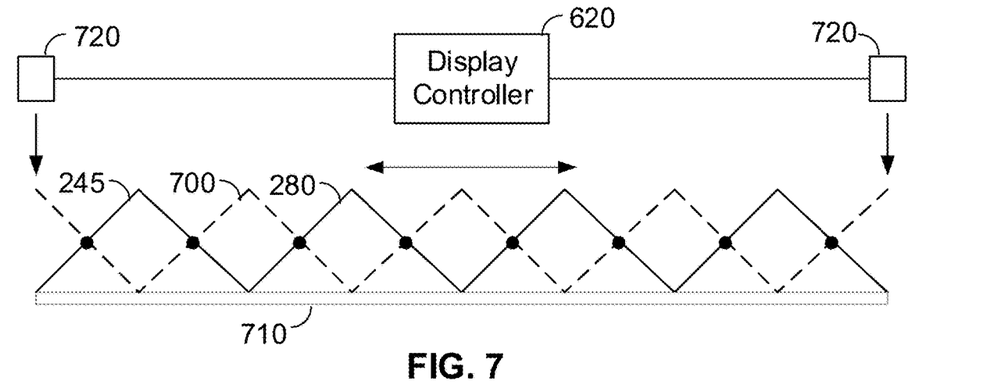
Figure 8:
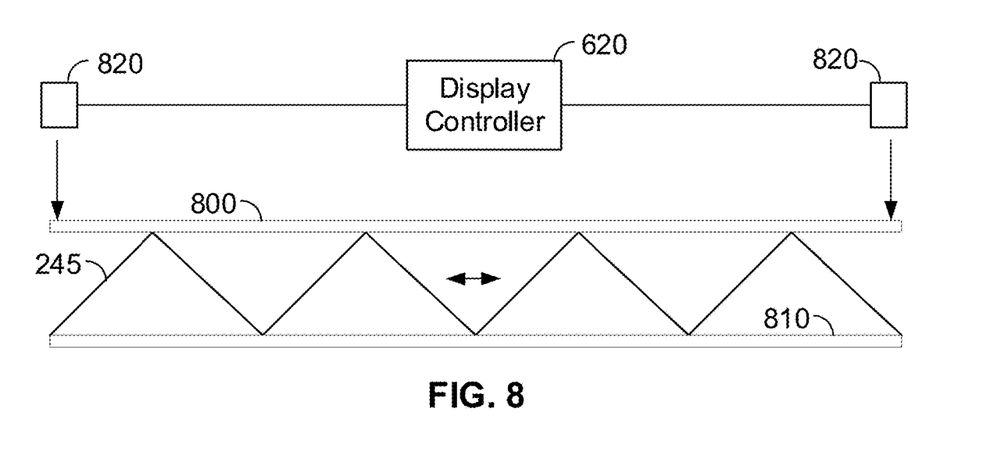

As above, display substrate 245 may be expanded or contracted as desired, to direct images in any desired directions. Substrate 245 may be expanded, contracted, or kept fixed in any manner. For example, substrate 245 may simply be kept fixed in a single configuration (i.e., $\theta$ is kept constant), such as by affixing folds 290 of substrate 245 to one or more rigid members such as transparent display substrates. Alternatively, substrate 245 may be expanded or contracted manually, or any one or more mechanisms may be employed to alter $\theta$ as desired. For example, any actuation mechanisms may be employed to alter the directions or orientations of segments 280 of substrate 245. FIGS. 6-8 are cross-sectional illustrations of display panels and exemplary actuators, constructed in accordance with embodiments of the disclosure. As illustrated in FIG. 6, any type of actuator may be connected to folds 290 of a display substrate 245, to actuate folds 290 laterally in the direction of the arrows shown. In particular, an actuation element 600 may be connected to folds 290 of one side of display substrate 245, such as by adhesion or by fabrication of actuation element 600 upon folds 290. Actuation element 600 may be any form of actuator. In one embodiment, actuation element 600 may be a thermal actuation element such as one or more metallic strips bonded to folds 290 and in electrical communication with a current source 610 that passes current through element 600. Element 600 is heated by current passing therethrough, expanding it and thus stretching substrate 245 laterally, increasing θ. Halting flow of current cools element 600, shrinking it and thus retracting substrate 245 laterally, decreasing θ. In this manner, element 600 may be expanded or contracted to any desired degree, to maintain θ at any desired value. Current levels from current source 610 may be adjusted to maintain any desired value of θ. Current source 610 may be controlled by a display controller 620 in electrical communication therewith, which commands current source 610 to output a specified current for actuation of element 600 to a specified value of θ. Display controller 620 may be any apparatus capable of directing current source 610 to pass a specified current through actuation element 600, or to pass a current sufficient to maintain a specified configuration of display substrate 245. For example, display controller 620 may be a microcontroller in electronic communication with a display driver and programmed to control current source 610 to maintain specified configurations of actuator 600, i.e., specified orientations of segments 280. As another example, display controller 620 may be any computing system, and may include one or more central processing units (CPUs), a system on chip (SoC), or the like, and may provide signals to actuation element 600 controlling its operation. These signals may include power signals using power supplied by a power source located remote from display controller 620, integrated within, on the SoC, or the like.

It is noted that actuation element 600 is not limited to a thermal actuator, and may be any type of actuation element. For example, actuation element 600 may employ an electrostatic actuator that expands or contracts according to applied electrostatic force, a piezoelectric or piezoresistive actuator that may alter its shape or actuate via an applied voltage, a thermal actuator such as a shape memory alloy actuator, a magnetic actuator, or any suitable actuator capable of coupling to one or more surfaces of a display substrate 245 to move it into a desired position.

FIG. 7 illustrates another exemplary actuation element in accordance with some embodiments of the disclosure. Here, a linkage 700, which may be similar in shape to the cross-section of display substrate 245, may be connected to midpoints of surfaces 280 as shown. Application of force to the linkage 700 as shown may flatten or expand substrate 245, increasing θ to any desired degree. In this manner, application of a desired force to linkage 700 may set θ to any desired value. Substrate 710 may provide support for substrate 245 and/or linkage 700 as desired, to prevent sagging of either structure. Actuation of linkage 700 may be carried out in any manner. For example, display controller 620 may be in electronic communication with one or more actuators 720, to drive portions of linkage 700 up or down as desired, to achieve any desired value of θ. As above, display controller 620 may be any apparatus capable of directing actuators 720 to maintain a specified configuration of display substrate 245. For example, display controller 620 may be a microcontroller in electronic communication with a display driver and programmed to control actuators 720 to maintain specified orientations of segments 280. As another example, display controller 620 may be any computing system, and may include one or more central processing units (CPUs), a system on chip (SoC), or the like, and may provide signals to actuators 720 controlling their operation. These signals may include power signals using power supplied by a power source located remote from display controller 620, integrated within, on the SoC, or the like.

FIG. 8 illustrates a further exemplary actuation element in accordance with some embodiments of the disclosure. Here, display substrate 245 may be sandwiched between and frictionally coupled to two substrates 800 and 810. Substrate 800 may then be pressed downward toward substrate 810 by application of force as shown, flattening and expanding substrate 245 to any desired degree. In some embodiments of the disclosure, substrate 800 is a transparent substrate to allow viewing of substrate 245. Force may be applied to substrate 800 in any manner, such as by coupling of one or more actuators, not shown, between substrates 800 and 810, applying an electrostatic force between the two substrates 800 and 810, or in any other suitable manner. In some embodiments, substrate 800 is located in only the top bezel, bottom bezel, or both the top and bottom bezel of the display apparatus and only acts on the top, bottom, or both the top and bottom of substrate 245. Actuation of substrate 800 may be carried out in any manner. For example, display controller 620 may be in electronic communication with one or more actuators 820, to drive portions of substrate 800 up or down as desired, to achieve any desired value of θ. As above, display controller 620 may be any apparatus capable of directing actuators 820 to maintain a specified configuration of display substrate 245. For example, display controller 620 may be a microcontroller in electronic communication with a display driver and programmed to control actuators 820 to maintain specified elevations of substrate 800, i.e., specified orientations of segments 280. As another example, display controller 620 may be any computing system, and may include one or more central processing units (CPUs), a system on chip (SoC), or the like, and may provide signals to actuators 820 controlling their operation. These signals may include power signals using power supplied by a power source located remote from display controller 620, integrated within, on the SoC, or the like.

It is also noted that display 100 may actuate its display substrate 245 automatically, in any manner. For example, display 100 may store any number of preset values of θ, and may actuate display substrate 245 between values of θ as desired, such as via a display controller 620. Display 100 may, for instance, allow users or viewers to select a desired viewing angle or direction at which its two images are directed, such as by selection of a value via an interface screen presented on display 100, a remote button, or the like. Display 100 may also or alternatively detect one or more viewers automatically, and adjust its display substrate 245, such as via a display controller 620, to project images to those detected users. As above, sensor 170 may be used to determine the relative locations of (or relative angle between) users/viewers 10, 20 in known manner, such as via known computer vision or machine learning techniques. The display 100 may then adjust display substrate 245 to the value of θ most closely corresponding to the locations or positions of each detected viewer, such as by any one or more of the actuation methods described above. In this manner, display 100 may determine the locations of nearby viewers 10, 20 automatically, and automatically direct its two separate images 130, 140 to the locations of these detected viewers 10, 20.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, any type of display capable of being folded into segments may be employed, and these segments may be actuated in any manner. Segments may be of any size, and may support any number or layout of pixels. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A single display device for a first user, for a second user, and for projecting different complete images in different directions, so that the first user in a first location may consume a first type of content, and the second user in a second location may consume a second type of content simultaneously, the single display device comprising:
    a display panel having first portions and second portions, the first portions each facing in a first direction and the second portions each facing in a second direction different from the first direction; and
    a display controller in electronic communication with the first portions and the second portions, the display controller configured to direct a first complete image to the first portions of the display panel for display therefrom, the first portions configured to display the first complete image to a first viewpoint of the first user, and to direct a second complete image to the second portions of the display panel for display therefrom, the second portions configured to display the second complete image to a second viewpoint of the second user,
    wherein the single display device is configured to:
        detect a first viewer;
        detect a second viewer;
        determine the first location of the detected first viewer;
        determine the second location of the detected second viewer; and
        set an angle between the first portions and the second portions to a value resulting in direction of the first complete image from the first portions to the determined first location and direction of the second complete image from the second portions to the determined second location.

2. The single display device of claim 1, wherein the display panel further comprises folds between adjacent first portions and second portions.

3. The single display device of claim 1, wherein each of the first portions and the second portions comprise one or more pixel columns.

4. The single display device of claim 1, wherein the first portions and the second portions collectively have a sawtooth cross-sectional shape.

5. The single display device of claim 1, further comprising a first audio output and a second audio output, the first audio output configured to generate audio signals corresponding to the first complete image, and the second audio output configured to generate audio signals corresponding to the second complete image.

6. The single display device of claim 1, wherein the display controller is further configured to simultaneously direct the first complete image to the first portions of the display panel and to direct the second complete image to the second portions of the display panel, for simultaneous display of the first complete image to a first viewing area and of the second complete image to a second viewing area different from the first viewing area.

7. The single display device of claim 1, further comprising at least one sensor in electronic communication with the display controller, the display controller configured to determine positions of the first user and the second user from output of the sensor, and further configured to orient the first portions and the second portions so as to direct the first and second complete images toward the positions of the first user and the second user, respectively.

8. The single display device of claim 1, further comprising a housing at least partially enclosing the display panel to form an exposed viewing area from which the first complete image and the second complete image are displayed, and an enclosed area covering a portion of the display panel positioned thereunder.

9. A single display device for a first user, for a second user, and for projecting different complete images in different directions, so that the first user in a first location may consume a first type of content, and the second user in a second location may consume a second type of content simultaneously, the single display device comprising:
    a display panel having first portions and second portions, the first portions each facing in a first direction and the second portions each facing in a second direction different from the first direction;
    a display controller in electronic communication with the first portions and the second portions, the display controller configured to direct a first complete image to the first portions of the display panel for display therefrom, the first portions configured to display the first complete image to a first viewpoint of the first user, and to direct a second complete image to the second portions of the display panel for display therefrom, the second portions configured to display the second complete image to a second viewpoint of the second user; and
    an actuation element coupled to the display panel and configured to actuate the display panel between a first configuration in which each first portion and its adjacent second portion have a first included angle, and a second configuration in which the each first portion and its adjacent second portion have a second included angle different from the first included angle,
    wherein the display controller is in electronic communication with the actuation element,
    wherein the display controller is configured to control the actuation element of the single display device to display the first complete image to the first viewpoint of the first user, and to display the second complete image to the second viewpoint of the second user,
    wherein the single display device is configured to:
        detect a first viewer;
        detect a second viewer;
        determine the first location of the detected first viewer;
        determine the second location of the detected second viewer; and
        set an angle between the first portions and the second portions to a value resulting in direction of the first complete image from the first portions to the determined first location and direction of the second complete image from the second portions to the determined second location.

10. The single display device of claim 9, wherein the display panel further comprises folds between adjacent first portions and second portions, and the actuation element is coupled to the folds of one side of the display panel.

11. The single display device of claim 9, wherein the actuation element comprises one or more of a micro-electromechanical system (MEMS) actuator, a thermal actuator, a piezoelectric actuator, an electrostatic actuator, and a magnetic actuator.

12. The single display device of claim 9, wherein the actuation element is configured to drive a linkage to achieve a desired angle between at least one of the first portions and at least one of the second portions.

13. A single display device for a first user, for a second user, and for projecting different complete images in different directions, so that the first user in a first location may consume a first type of content, and the second user in a second location may consume a second type of content simultaneously, the single display device comprising:
   a display substrate having a plurality of folds, and substantially planar portions between adjacent folds, each planar portion having one or more pixel columns formed thereon;
   a first data driver in electronic communication with the pixel columns of a first set of the planar portions, to display a first complete image from the first set of the planar portions to a first viewpoint of the first user; and
   a second data driver in electronic communication with the pixel columns of a second set of the planar portions, to display a second complete image from the second set of the planar portions to a second viewpoint of the second user,
   wherein each of the first set of the planar portions projects a portion of the first complete image, and
   wherein each of the second set of the planar portions projects a portion of the second complete image, and
   wherein the single display device is configured to:
      detect a first viewer;
      detect a second viewer;
      determine the first location of the detected first viewer;
      determine the second location of the detected second viewer; and
      set an angle between the first set of planar portions and the second set of planar portions to a value resulting in direction of the first complete image from the first set of planar portions to the determined first location and direction of the second complete image from the second set of planar portions to the determined second location.

14. The single display device of claim 13, wherein the planar portions of the first set and the planar portions of the second set are positioned in alternating manner along the display substrate.

15. The single display device of claim 14, wherein the planar portions of the first set are each oriented to face a first direction, and the planar portions of the second set are each oriented to face a second direction different from the first direction.

16. The single display device of claim 13, wherein the planar portions of the first and second sets collectively have a sawtooth cross-sectional shape.

17. The single display device of claim 13, further comprising a display controller in electronic communication with the first data driver to transmit image data of a first complete image to the first data driver, and in electronic communication with the second data driver to transmit image data of a second complete image to the second data driver, so as to display the first complete image from the first set of the planar portions, and to display the second complete image from the second set of the planar portions.

18. A single display device for a first user, for a second user, and for projecting different complete images in different directions, so that the first user in a first location may consume a first type of content, and the second user in a second location may consume a second type of content simultaneously, the single display device comprising:
   a display substrate having a plurality of folds, and substantially planar portions between adjacent folds, each planar portion having one or more pixel columns formed thereon;
   an actuation element coupled to the display substrate and configured to actuate the display substrate between a first configuration in which a planar portion of the first set and its adjacent planar portion of the second set have a first included angle, and a second configuration in which the planar portion of the first set and its adjacent planar portion of the second set have a second included angle different from the first included angle,
   wherein the display controller is in electronic communication with the actuation element,
   wherein the display controller is configured to control the actuation element of the single display device to display the first complete image to the first viewpoint of the first user, and to display the second complete image to the second viewpoint of the second user,
   wherein the single display device is configured to:
      detect a first viewer;
      detect a second viewer;
      determine the first location of the detected first viewer;
      determine the second location of the detected second viewer; and
      set an angle between the first set of planar portions and the second set of planar portions to a value resulting in direction of the first complete image from the first set of planar portions to the determined first location and direction of the second complete image from the second set of planar portions to the determined second location.

19. The single display device of claim 18, wherein the actuation element comprises a micro-electromechanical system (MEMS) actuator, a thermal actuator, a piezoelectric actuator, an electrostatic actuator, and a magnetic actuator.

20. The single display device of claim 18, wherein the actuation element is configured to drive a linkage to achieve a desired angle between at least one of the first set of the planar portions and at least one of the second set of the planar portions.

* * * * *